(12) United States Patent
Watanabe

(10) Patent No.: US 10,465,933 B2
(45) Date of Patent: Nov. 5, 2019

(54) AIR CONDITIONER

(71) Applicant: Mitsubishi Electric Corporation, Tokyo (JP)

(72) Inventor: Kazuhiro Watanabe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/538,815

(22) PCT Filed: Mar. 27, 2015

(86) PCT No.: PCT/JP2015/059697
§ 371 (c)(1),
(2) Date: Jun. 22, 2017

(87) PCT Pub. No.: WO2016/157311
PCT Pub. Date: Oct. 6, 2016

(65) Prior Publication Data
US 2017/0363313 A1 Dec. 21, 2017

(51) Int. Cl.
*F24F 11/30* (2018.01)
*G01J 5/00* (2006.01)
(Continued)

(52) U.S. Cl.
CPC .............. *F24F 11/30* (2018.01); *G01J 5/0025* (2013.01); *F24F 11/32* (2018.01); *F24F 11/52* (2018.01);
(Continued)

(58) Field of Classification Search
CPC ........ F24F 11/30; F24F 11/32; F24F 2120/10; F24F 2120/12; F24F 11/52; F24F 11/56; G01J 5/0025
See application file for complete search history.

(56) References Cited

U.S. PATENT DOCUMENTS 5,097,671 A * 3/1992 Jeong-Hun ........ G05D 23/1905
62/126
6,009,939 A 1/2000 Nakanish et al.
(Continued)

FOREIGN PATENT DOCUMENTS

JP 01-131846 A 5/1989
JP 05-157313 A 6/1993
(Continued)

OTHER PUBLICATIONS

International Search Report of the International Searching Authority dated Jun. 9, 2015 for the corresponding International application No. PCT/JP2015/059697 (and English translation).
(Continued)

*Primary Examiner* — Christine S. Kim
(74) *Attorney, Agent, or Firm* — Posz Law Group, PLC

(57) ABSTRACT

An air conditioner includes an indoor unit installed on an indoor side, an outdoor unit installed on an outdoor side, a human detector that detects a person in a room, and a remote controller that performs radio communication with the indoor unit, and the air conditioner conditions the indoor air. The indoor unit includes an indoor unit control section that controls the indoor unit, a diagnostic section that diagnoses whether an operating state of the human detector is normal or abnormal, and a communication section that performs radio communication with the remote controller. The human detector includes a plurality of infrared sensors, a rotary table that supports each of the infrared sensors, and a human detector control section that controls the human detector. The diagnostic section diagnoses whether the operating state of the human detector is normal or abnormal by comparing the detected results between the respective infrared sensors on receiving a trigger signal transmitted from the remote controller.

20 Claims, 7 Drawing Sheets

(51) Int. Cl.
*F24F 120/10* (2018.01)
*F24F 120/12* (2018.01)
*F24F 11/32* (2018.01)
*F24F 11/56* (2018.01)
*F24F 11/52* (2018.01)

(52) U.S. Cl.
CPC ............ *F24F 11/56* (2018.01); *F24F 2120/10* (2018.01); *F24F 2120/12* (2018.01)

(56) References Cited

U.S. PATENT DOCUMENTS

| | | |
|---|---|---|
| 2004/0050077 A1 | 3/2004 | Kasai et al. |
| 2006/0286923 A1* | 12/2006 | Oka ................. F24F 1/0011 454/259 |
| 2010/0168922 A1* | 7/2010 | Park ..................... F24F 11/77 700/276 |
| 2015/0013362 A1* | 1/2015 | Yumoto ............. F24F 11/0034 62/126 |
| 2015/0204556 A1* | 7/2015 | Kusukame ......... B60H 1/00742 165/237 |

FOREIGN PATENT DOCUMENTS

| | | |
|---|---|---|
| JP | 06-241526 A | 8/1994 |
| JP | 09-236297 A | 9/1997 |
| JP | 2001-182994 A | 7/2001 |
| JP | 2002-310490 A | 10/2002 |
| JP | 2003-194385 A | 7/2003 |
| JP | 2005-233538 A | 9/2005 |
| JP | 2008-224140 A | 9/2008 |
| JP | 2009-024962 A | 2/2009 |
| JP | 2009-180414 A | 8/2009 |
| JP | 2010-091158 A | 4/2010 |
| JP | 2010-255900 A | 11/2010 |
| JP | 2011-080667 A | 4/2011 |
| JP | 2011-094965 A | 5/2011 |
| JP | 2013-088086 A | 5/2013 |
| KR | 20100112438 A * | 10/2010 |

OTHER PUBLICATIONS

Extended European Search Report dated Mar. 9, 2017 for the corresponding EP application No. 15862146.6.
Office Action dated Jul. 10, 2018 issued in corresponding JP patent application No. 2017-508844 (and English translation).

* cited by examiner

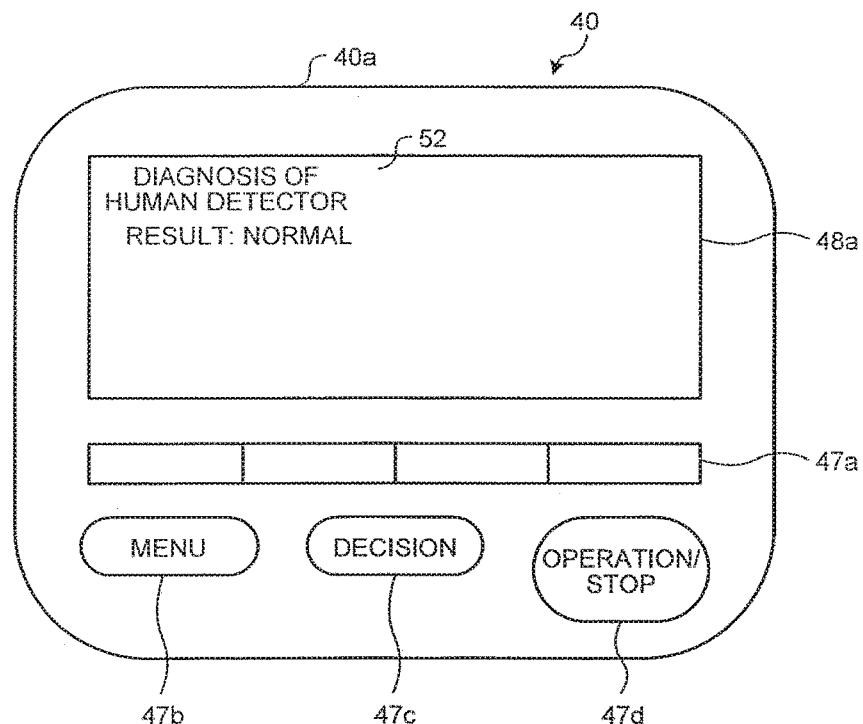
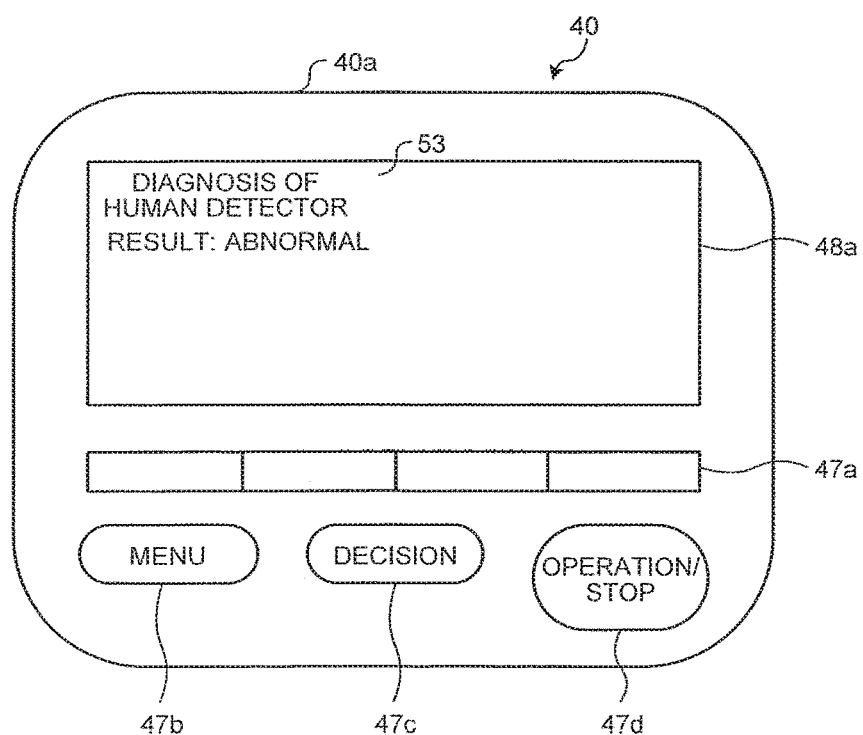

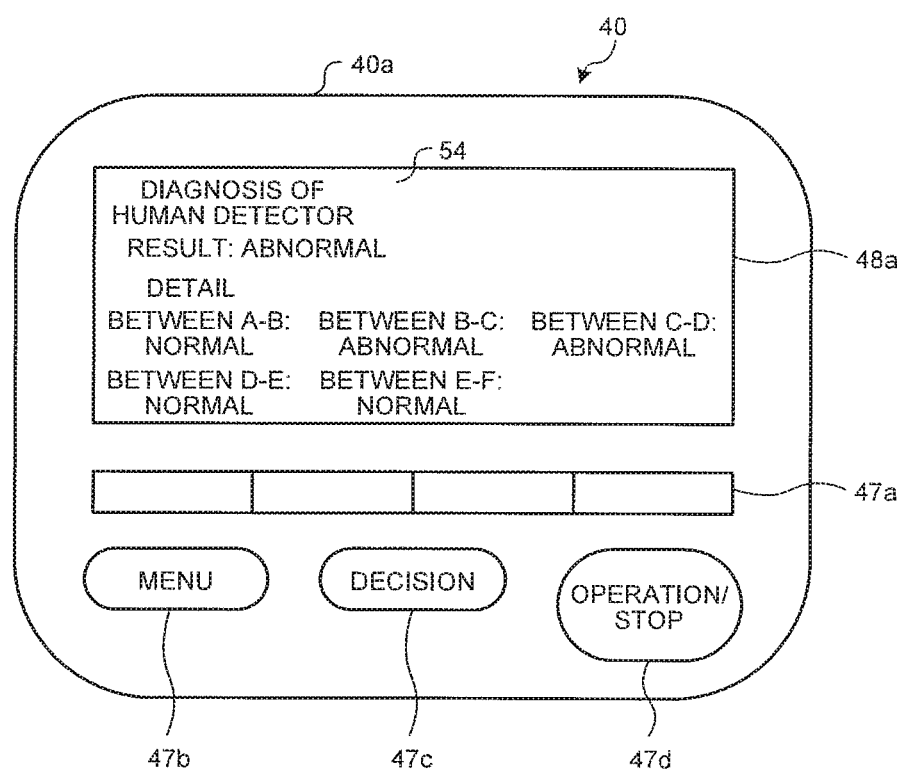

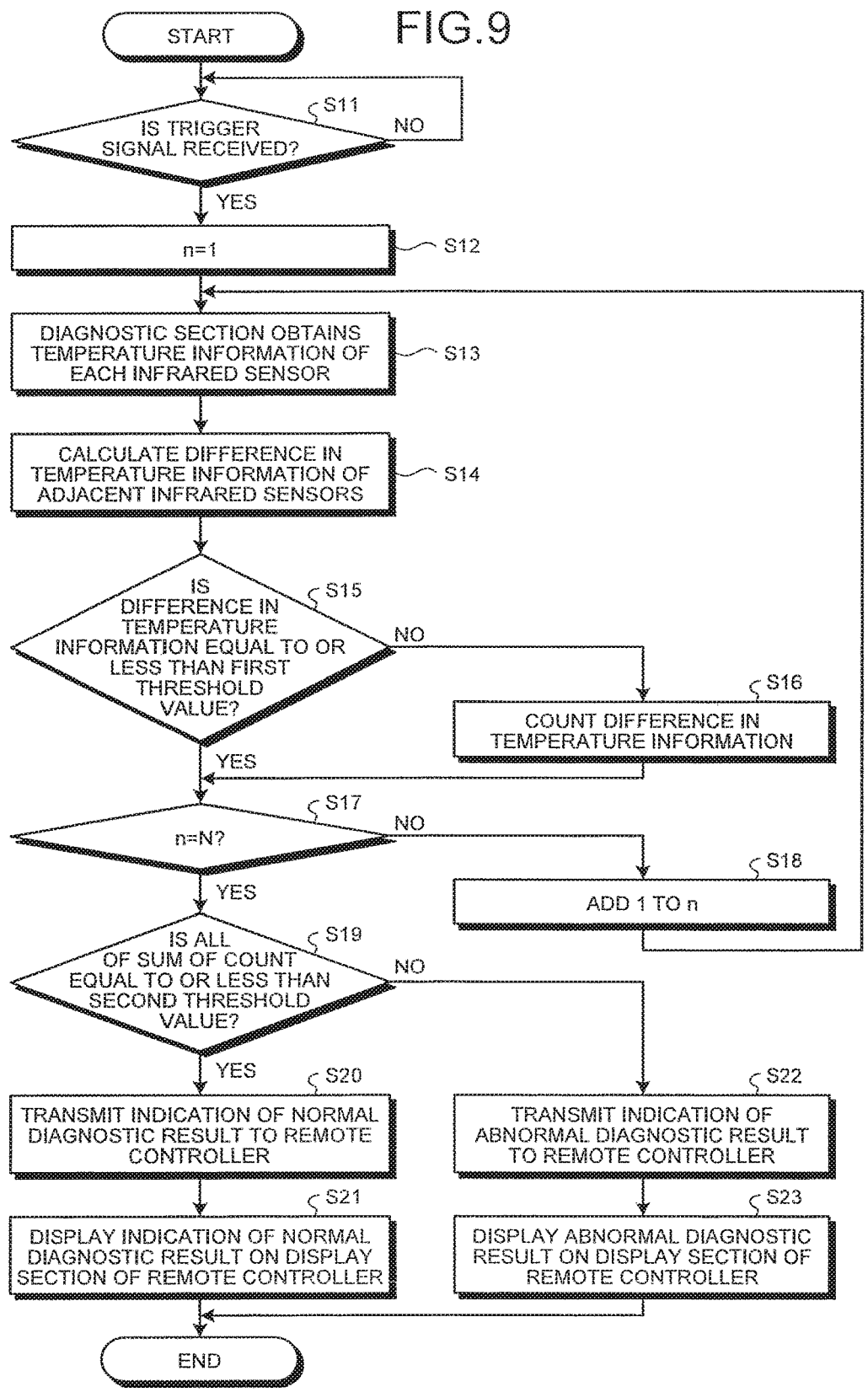

AIR CONDITIONER

CROSS REFERENCE TO RELATED APPLICATION

This application is a U.S. national stage application of International Patent Application No. PCT/JP2015/059697 filed on Mar. 27, 2015, the disclosure of which is incorporated herein by reference.

TECHNICAL FIELD

The present invention relates to an air conditioner having a human detector mounted thereon.

BACKGROUND

There are air conditioners that improve energy efficiency by detecting a person by a human detector and by controlling the air-conditioning of indoor air depending on whether there is a person in a room. As the air conditioners, there is an air conditioner having a function of diagnosing whether the operating state of the human detector is normal or abnormal. For example, Patent Literature 1 discloses an apparatus that diagnoses whether the operating state of the human detector is normal or abnormal on the basis of a voltage level that is input to a signal processing unit within the time set after a power supply voltage of the human detector enters an ON-state. Patent Literature 2 discloses an apparatus that includes a unit for forcibly generating a signal of the human detection sensor, and diagnoses whether the operating state of the human detector is normal or abnormal, by operating the unit for forcibly operating the signal of the human detection sensor to detect whether the signal is generated by the human detection sensor.

PATENT LITERATURE

Patent Literature 1: Japanese Patent Application Laid-Open No. 2009-024962
Patent Literature 2: Japanese Patent Application Laid-Open No. 2010-091158

In Patent Literatures 1 and 2, the abnormality can be detected when there is an abnormality in the circuit of the sensor of the human detector; however, it is difficult to diagnose, for example, a case where the operating state of the human detector is not normal because the human detector is defective or degraded, that is, there is a problem in the detection accuracy although the sensor is running.

The present invention has been made in view of the above circumstances and an object thereof is to obtain an air conditioner capable of performing a diagnosis of the operating state of the detector easily with higher accuracy.

SUMMARY

According to an aspect of the present invention in order to solve the problems and achieve the object, there is provided an air conditioner including: an indoor unit; an outdoor unit connected to the indoor unit; a remote controller that communicates with the indoor unit and transmits a trigger signal to the indoor unit; and a detector having: a plurality of infrared sensors that detect infrared rays emitted from predetermined detection ranges of a room where the indoor unit is provided, the predetermined detection ranges being adjacently arranged; and a detection processing range where the infrared rays are detected by moving the predetermined detection ranges, wherein the indoor unit includes a diagnostic section, on receiving the trigger signal, that operates the infrared sensors of the detector, obtains detected results of the infrared sensors, and diagnoses whether an operating state of the detector is normal or abnormal by comparing the detected results of the infrared sensors whose detection ranges are adjacent.

Advantageous Effects of Invention

According to the present invention, there is an effect of obtaining an air conditioner capable of more accurately and easily performing a diagnosis of the operating state of the detector.

BRIEF DESCRIPTION OF DRAWINGS

FIG. 6 is a diagram illustrating an example of a display screen of the result indicating that the diagnostic result of the human detector is normal.
FIG. 7 is a diagram illustrating an example of a display screen of the result indicating that the diagnostic result of the human detector is abnormal.
FIG. 8 is a diagram illustrating an example of a display screen of detailed results when the diagnostic result of the human detector is abnormal.
FIG. 9 is a flowchart illustrating an example of the processing of a diagnostic section and a remote controller in the air conditioner.

DETAILED DESCRIPTION

An air conditioner according to the embodiments of the present invention will be described below in detail with reference to the drawings. The description of the following embodiments does not limit the present invention.

First Embodiment

Figure 1:
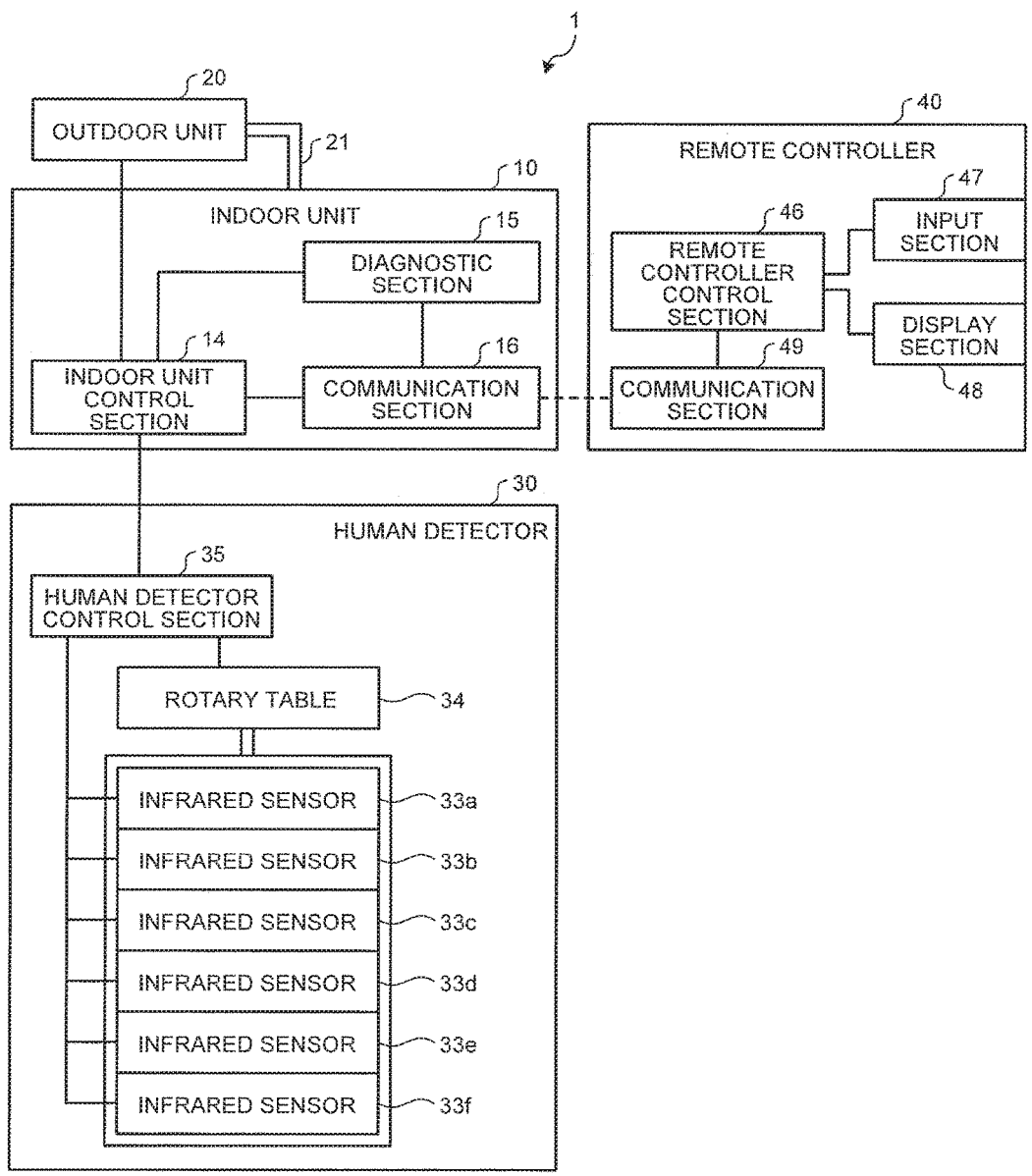
FIG. 1 is a block diagram of a configuration of an air conditioner.

FIG. 1 is a block diagram of a configuration of an air conditioner 1 according to the first embodiment. The air conditioner 1 conditions indoor air. The air conditioner 1 includes an indoor unit 10 installed on an indoor side, an outdoor unit 20 installed on an outdoor side to cool the heat medium circulating in the indoor unit 10, a human detector 30 as a detector installed on the indoor side to detect a human in a room, and a remote controller 40 (abbreviated as a remote controller in FIG. 1) that is in radio communication with the indoor unit 10. In the first embodiment, although the description will be given of the case of using the human detector 30 for detecting a human as a detector, a detecting target is not limited to humans, and detectors for detecting objects other than human may be used. In the first embodiment, the description will be given of a case where the indoor unit 10 and the remote controller 40 are in radio communication with each other, but the communication therebetween is not limited to the radio communication. The indoor unit 10 and the remote controller 40 may be connected to each other by a signal line, and both of them may be in wire communication with each other. The indoor unit 10 and the outdoor unit 20 of the air conditioner 1 are connected to each other by a connection pipe 21 through which the heat medium circulates. The heat medium is circulated between the indoor unit 10 and the outdoor unit 20. The indoor unit 10 is connected to the human detector 30 by a wiring.

The indoor unit 10 includes an indoor unit control section 14 that controls the operation of each section of the indoor unit 10, a diagnostic section 15 that diagnoses whether the operating state of the human detector 30 is normal or abnormal, a communication section 16 that is in radio communication with the remote controller 40. The indoor unit control section 14, the diagnostic section 15, and the communication section 16 are communicably connected to one another. Further, the indoor unit control section 14 controls the outdoor unit 20 by supplying a power supply voltage to the outdoor unit 20 via an electric wiring. The outdoor unit 20 is operated on the basis of the instruction that is output from the indoor unit control section 14. Further, the outdoor unit 20 may perform the control independently from the control of the indoor unit control section 14. Specifically, the operating conditions set in the indoor unit 10 may not be included in the control conditions, and the operation may be controlled on the basis of the state of the heat medium flowing in the outdoor unit 20.

The indoor unit control section 14 receives the signal of command on the conditioning of air (hereinafter, referred to as a command signal) from the remote controller 40 via the communication section 16. The command signal is at least one of operating or stopping commands, switching commands of air-conditioning modes such as heating, cooling and dehumidification, commands for raising or lowering the air-conditioning temperature, and commands for changing the direction of sending the air from the indoor unit 10. The indoor unit control section 14 changes the settings of the air-conditioning of the air according to the command signals to control the operation of each section of the indoor unit 10 and the outdoor unit 20.

The human detector 30 includes a plurality of infrared sensors 33a, 33b, 33c, 33d, 33e, and 33f, a rotary table 34 for supporting the plurality of infrared sensors 33a to 33f, and a human detector control section 35 that controls the human detector 30.

Figure 2:
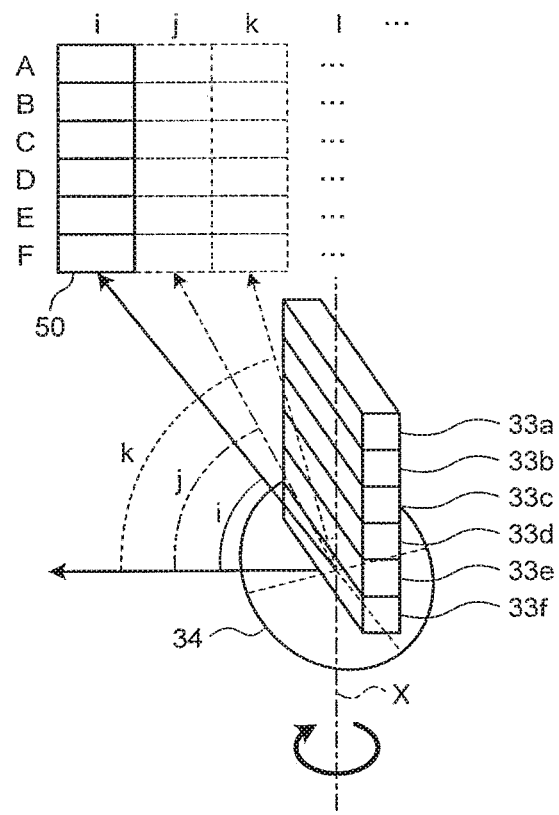
FIG. 2 is a diagram illustrating each infrared sensor and a rotary table.

FIG. 2 is a diagram illustrating each infrared sensor and the rotary table. The infrared sensors 33a to 33f detect the infrared rays emitted from the objects that are present in the detection range. Each of the infrared sensors 33a to 33f is linearly arranged and fixed in a row. Each of the infrared sensors 33a to 33f may have the specifications identical to one another or may have the specifications different from one another. The rotary table 34 has a support section that supports the respective infrared sensors 33a to 33f, and a driving section that rotates the supporting section, and rotates the infrared sensors 33a to 33f arranged in a row in an integrated fashion. The rotary table 34 rotates the support section that supports each of the infrared sensors 33a to 33f around a rotary axis X. Here, the infrared sensors 33a to 33f arranged in a row are stacked in a direction along the rotary axis X. The detection ranges of the infrared sensors 33a to 33f on the rotary table 34 are defined as detection ranges A, B, C, D, E, and F, respectively. The detection directions of each of the infrared sensors 33a to 33f are oriented in the directions parallel to each other on the rotary table 34. Each of the detection ranges A to F of the respective infrared sensors 33a to 33f moves by the rotation of the rotary table 34. Accordingly, the detection ranges of each of the infrared sensors 33a to 33f move by the same angle as a variation amount of the rotation angle of the rotary table 34 depending on the rotation of the rotary table 34. Each of the infrared sensors 33a to 33f detects the infrared rays emitted from the angle range of constant height and width around the detection direction in the room. The human detector 30 detects the infrared rays of the detection processing range 50 that is defined by the respective detection ranges A to F of each of the infrared sensors 33a to 33f and the range of the rotation angle of the rotary table 34.

Although the human detector 30 of the first embodiment has six infrared sensors 33a to 33f, it may have at least two or more infrared sensors. Each of the infrared sensors 33a to 33f is not limited to the form linearly arranged in a line in the longitudinal direction, and may be in the form arranged in a plurality of rows or in the form arranged in a curved shape. Each of the infrared sensors 33a to 33f is not limited to the form arranged toward the directions parallel to one another, and may be in the form arranged in directions different from one another. The human detector 30 may include a mechanism that moves the detection positions of the infrared sensors 33a to 33f other than the rotary table 34. The human detector 30 may also use a parallel moving table that is movable in parallel in the horizontal direction instead of the rotary table 34 and changes the detection ranges of the infrared sensors 33a to 33f in the horizontal direction.

The human detector control section 35 is communicably connected to the respective infrared sensors 33a to 33f, and obtains the detected results of the respective infrared sensors 33a to 33f. As the detected results of the respective infrared sensors 33a to 33f, the detection information of the infrared rays is exemplified. The human detector control section 35 controls the rotary direction of the rotary table 34. The human detector control section 35 controls the attitudes of each of the infrared sensors 33a to 33f and controls the detection range, by controlling the rotary direction of the rotary table 34. The human detector control section 35 obtains the position information (the information of the direction) of the detection ranges of the respective infrared sensors 33a to 33f from the rotary table 34. The human detector control section 35 may obtain the position information of the detection ranges of the respective infrared sensors 33a to 33f on the basis of the control information for controlling the position of the rotary table 34, and may obtain the position information of the detection ranges of the respective infrared sensors 33a to 33f, on the basis of the information of the position detector while a position detector in the rotary direction, such as an encoder is provided in the rotary table 34.

The human detector control section 35 is communicably connected to the indoor unit control section 14. The human detector control section 35 determines whether there is a person, on the basis of the position information of the detection ranges of the respective infrared sensors 33a to 33f and the detection information of the infrared rays within the detection range (hereinafter, collectively referred to as infrared information).

Figure 3:
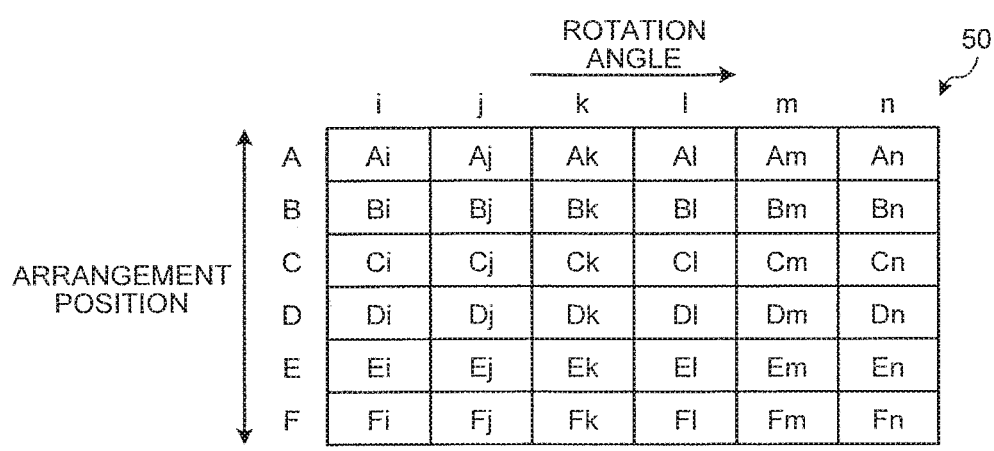
FIG. 3 is a diagram illustrating a detection processing range of a human detector.

FIG. 3 is a diagram illustrating the detection processing range 50 of the human detector 30. The detection processing range 50 is the sum of the ranges in which each of the infrared sensors 33a to 33f detects the infrared rays, while the rotary table 34 changes to the rotation angles i to n.

When rotating the rotary table 34 from the reference position by the rotation angle i, each of the infrared sensors 33a, 33b, 33c, 33d, 33e, and 33f detects the infrared rays emitted from the detection ranges Ai, Bi, Ci, Di, Ei, and Fi defined by the directions of each of the detection ranges A to F, and the rotation angle i. Hereinafter, similarly, when rotating the rotary table 34 from the reference position by the rotation angle j, the infrared sensors 33a to 33f detects the infrared rays emitted from the detection ranges Aj to Fj, respectively. When rotating the rotary table 34 from the reference position by the rotation angle k, each of the infrared sensors 33a to 33f detects the infrared rays emitted from the detection ranges Ak to Fk. When rotating the rotary table 34 from the reference position by the rotation angle 1, each of the infrared sensors 33a to 33f detects the infrared rays emitted from the ranges Al to Fl. When rotating the rotary table 34 from the reference position by the rotation angle m, each of the infrared sensors 33a to 33f detects the infrared rays emitted from the detection ranges Am to Fm. When rotating the rotary table 34 from the reference position by the rotation angle n, each of the infrared sensors 33a to 33f detects the infrared rays emitted from the detection ranges An to Fn. That is, the range in which each of the infrared sensors 33a to 33f detects the infrared rays when the rotary table 34 rotates from the reference position by a predetermined rotation angle is defined as the intersecting ranges in the direction of each of the detection ranges A, B, C, D, E, and F and the rotation angles i, j, k, l, m, and n. While the rotary table 34 changes to the rotation angles i to n, the sum of the detection ranges in which each of the infrared sensors 33a to 33f detects the infrared rays becomes the detection processing range 50. In this way, the human detector 30 can detect the infrared rays in the detection processing range 50. The respective detection processing ranges are determined, depending on the number and arrangement of the infrared sensors in the human detector, and the specifications of the table for movably supporting the infrared sensors.

The human detector control section 35 transmits the detected result, that is, information as to whether there is a person or information as to where a person is when there is a person, to the indoor unit control section 14. The indoor unit control section 14 determines the setting of the conditioning of air in the indoor unit 10 on the basis of the received results. The indoor unit control section 14 changes the setting of the conditioning of air depending on changes in the human detected results, that is, when the state of not detecting a person changes to a state of detecting a person, when the state of detecting a person changes to the state of not detecting the person, when the number of the detected persons changes or when the positions of the detected persons move.

Moreover, when a signal for determining the state of the human detector 30 described later is input, the human detector control section 35 transmits the position information of the detection ranges of the respective infrared sensors 33a to 33f and the detection information of the infrared rays within the detection ranges (hereinafter, collectively referred to as the infrared information) to the indoor unit control section 14. When the indoor unit control section 14 acquires, from the diagnostic section 15, the information indicating the reception of a trigger signal from the remote controller 40, the indoor unit control section 14 outputs the received infrared information to the diagnostic section 15.

When the trigger signal is received from the remote controller 40, the diagnostic section 15 outputs information indicating the reception of the trigger signal to the indoor unit control section 14 and obtains the infrared information of each of the infrared sensors 33a to 33f from the indoor unit control section 14. The trigger signal is a signal serving as a trigger in response to which the diagnostic section 15 starts the diagnosis of the operating state of the human detector 30. The diagnostic section 15 obtains the infrared information (detected results) of each of the infrared sensors 33a to 33f. The diagnostic section 15 diagnoses whether the operating state of the human detector 30 is normal or abnormal, by comparing the respective detected results. That is, the diagnostic section 15 diagnoses whether the operating state of the human detector 30 is normal or abnormal, by comparing the detected result of one of the infrared sensors 33a to 33f with the detected result of another one of the infrared sensors 33a to 33f. The diagnostic section 15 preferably compares the detected results of the adjacent infrared sensors 33a to 33f. The detected result is at least one of information on the intensity of the detected infrared rays (hereinafter, referred to as intensity information), information on the wavelength having the strongest intensity in the detected infrared distribution (hereinafter, referred to as wavelength information), and information on the temperature measured by the infrared sensors 33a to 33f (hereinafter, referred to as temperature information).

Specifically, the diagnostic section 15 calculates a difference in the detected results of the two infrared sensors selected from the respective infrared sensors 33a to 33f. When the difference obtained by the calculation is equal to or less than a first threshold value, the diagnostic section 15 determines the difference in the detected results to be normal, and when the difference is greater than the first threshold value, the diagnostic section 15 determines the difference in the detected results to be abnormal. The first threshold value is a reference value with which whether the difference in the detected results is normal or abnormal is determined, and its setting can be suitably changed. In the first embodiment, the first threshold value is set to 5° C. The diagnostic section 15 detects the difference in the detected results between the adjacent two infrared sensors of the respective infrared sensors 33a to 33f to perform the aforementioned determination.

Further, after receiving the trigger signal, the diagnostic section 15 repeats the determination of the diagnosis of the difference in the respective detected results on the basis of the comparison of the aforementioned detected results between the infrared sensors at each position by the set number of times, while moving the measurement positions by rotating the respective infrared sensors 33a to 33f using the rotary table 34. The diagnostic section 15 counts the number of times in which the difference in the detected results is diagnosed to be abnormal. As the difference in the detected results, a difference in the temperature information (a temperature difference) measured by the respective infrared sensors 33a to 33f is exemplified. The diagnostic section 15 diagnoses that the difference in the detected results between the respective infrared sensors used for calculating the difference in the detected results is normal, after repeating the diagnosis of the difference in the detected results by the set number of times, when the sum of the counts of the difference in the detected results is less than a second threshold value. The diagnostic section 15 diagnoses that the difference in the detected results between the respective infrared sensors used for calculating the difference in the detected results is abnormal, when the sum of the counts of the difference in the detected results reaches the second threshold value, within the time of repeating the diagnosis of the difference in the respective detected results by the predetermined number of times. The second threshold is a reference value with which whether the human detector 30 is normal or abnormal is determined, and its setting can be suitably changed. In the first embodiment, the second threshold is set to three.

The diagnostic section 15 diagnoses that the operating state of the human detector 30 is normal when all the differences in the detected results are diagnosed to be normal between the respective infrared sensors 33*a* to 33*f*, and diagnoses that the operating state of the human detector 30 is abnormal when at least one difference in the detected results between the respective infrared sensors 33*a* to 33*f* is diagnosed to be abnormal. The diagnostic section 15 transmits the information (hereinafter, referred to as diagnostic result information) on the diagnostic results of the operating states of the human detector 30 to the remote controller 40 via the communication section 16.

The remote controller 40 includes a remote controller control section (in FIG. 1, abbreviated to as a remote controller control section) 46 that controls the remote controller 40, an input section 47 that accepts an input, a display section 48 that performs the display, and a communication section 49 that performs radio communication with the indoor unit 10. The remote controller control section 46 obtains the input information from the input section 47, and receives the air-conditioning information and the diagnostic result information from the indoor unit 10 via the communication section 49. The remote controller control section 46 outputs at least one of the obtained input information, the received air-conditioning information and the diagnostic result information to the display section 48 to be displayed. The remote controller control section 46 converts the obtained input information into the command signal or the trigger signal, and transmits the signal to the indoor unit 10 via the communication section 49. The input section 47 outputs the accepted input information to the remote controller control section 46. The display section 48 displays at least one of the input information, the air-conditioning information and the diagnostic result information which are output from the remote controller control section 46. The indoor unit 10 and the remote controller 40 perform the radio communication of the information, via the communication section 16 and the communication section 49, respectively.

Figure 4:
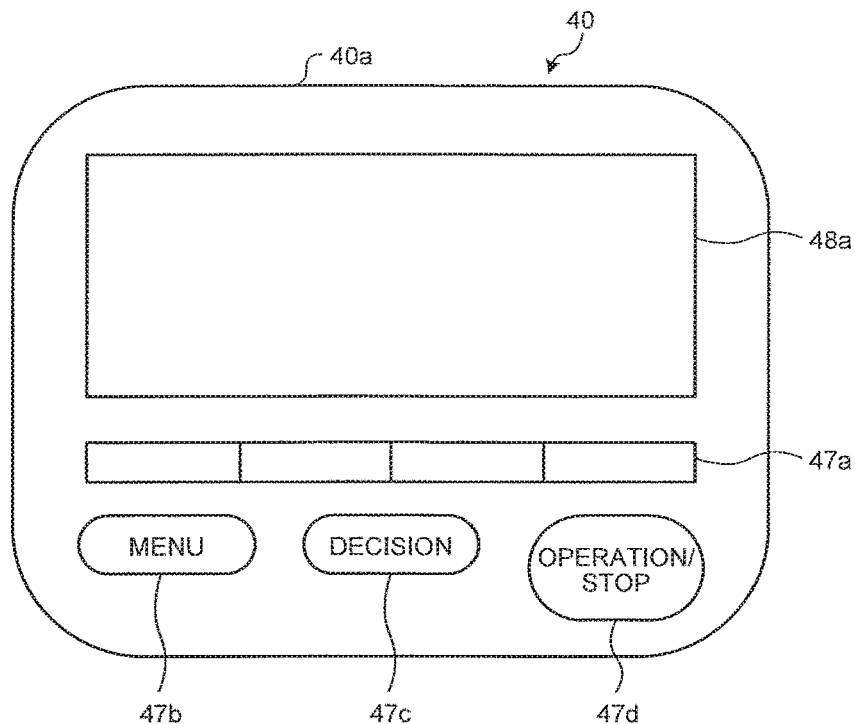
FIG. 4 is a diagram illustrating an example of a remote controller provided in the air conditioner.

FIG. 4 is a diagram illustrating an example of the remote controller 40 provided in the air conditioner 1. The remote controller 40 includes a housing 40*a*, various buttons 47*a*, a menu button 47*b*, a decision button 47*c*, and an operation or stop button 47*d* which are provided in the lower half of the housing 40*a* to serve as the input section 47, and a display 48*a* provided in the upper half of the housing 40*a* to serve as a display section 48. In the first embodiment, although all of various buttons serving as the input section 47 output the input information to the remote controller control section 46 by being pressed, the various buttons may output the input information, by being touched, by being pulled or by being twisted. Hereinafter, when collectively referring to the various buttons serving as the input section 47, they will be referred to as buttons 47*a* to 47*d*.

Figure 5:
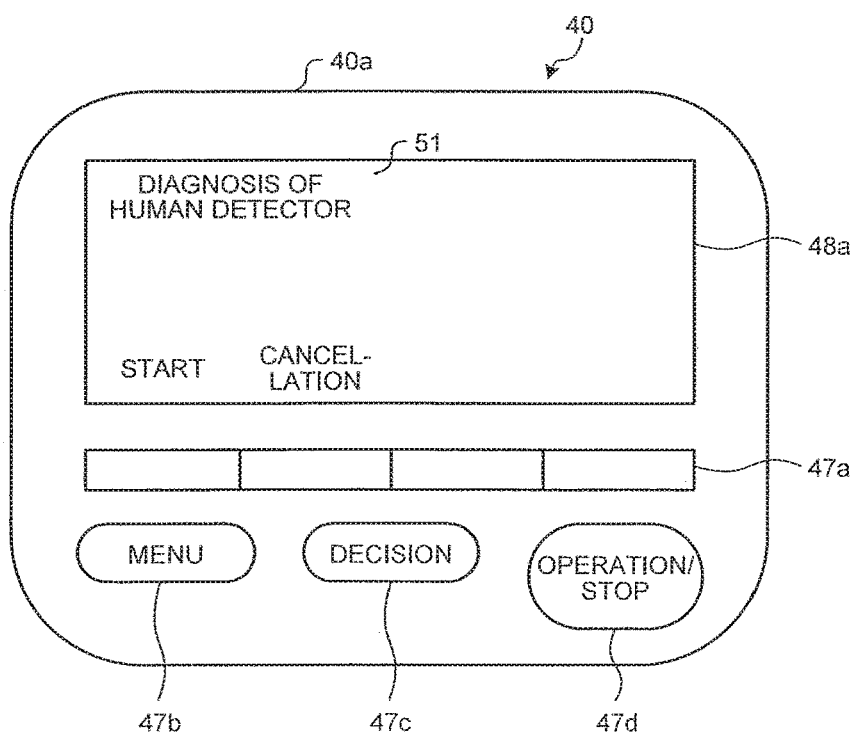
FIG. 5 is a diagram illustrating an example of a display screen at the time of performing the diagnosis of the human detector.

FIG. 5 is a diagram illustrating an example of a display screen 51 at the time of performing the diagnosis of the human detector 30. By operating the buttons 47*a* to 47*d*, the display 48*a* displays the display screen 51. The display screen 51 has a message "diagnosis of human detector" in the upper part of the display 48*a*, and messages of "start" and "cancellation" in the lower part of the display 48*a*. When pressing the decision button 47*c* in a state in which the message of "start" is selected, the input information indicating the transmission of the trigger signal to the indoor unit 10 is input to the remote controller control section 46. When pressing the decision button 47*c* in a state in which the message of "cancellation" is selected, the input information indicating the transmission of the trigger signal to the indoor unit 10 is not input to the remote controller control section 46, and the display 48*a* switches the message to an initial screen including at least one of the input information and the air-conditioning information.

FIG. 6 is a diagram illustrating an example of a display screen 52 of the result indicating that the diagnostic result of the human detector 30 is normal. When the remote controller control section 46 receives the diagnostic result information that the diagnostic result of the human detector 30 is normal, from the indoor unit 10 via the communication section 49, the display 48*a* displays the display screen 52. The display screen 52 has a message of "diagnosis of human detector" in the upper part of the display 48*a*, and a message of "result: normal" immediately below the message of "diagnosis of human detector".

FIG. 7 is a diagram illustrating an example of a display screen 53 of the result indicating that the diagnostic result of the human detector 30 is abnormal. When the remote controller control section 46 receives the diagnostic result information that the diagnostic result of the human detector 30 is abnormal, from the indoor unit 10 via the communication section 49, the display 48*a* displays the display screen 53. The display screen 53 has a message of "diagnosis of human detector" in the upper part of the display 48*a*, and a message of "result: abnormal" immediately below the display of "diagnosis of human detector".

FIG. 8 is a diagram illustrating an example of a display screen 54 of the detailed results when the diagnostic result of the human detector 30 is abnormal. By suitably operating the buttons 47*a* to 47*d*, in a case where the human detector 30 is previously set to display the detailed results when the diagnostic result of the human detector 30 is abnormal, when the remote controller control section 46 obtains the diagnostic result information that the diagnostic result of the human detector 30 is abnormal, from the indoor unit 10 via the communication section 49, the display 48*a* does not display the display screen 53 but displays the display screen 54. The display screen 54 has a message of "diagnosis of human detector" in the upper part of the display 48*a*, a message of "result: abnormal" immediately below the message of "diagnosis of human detector", and a message of detailed results of the diagnosis of the human detector 30 immediately below the message of "result: abnormal". The messages of the detailed results have a message of "detail", a message indicating whether the difference in the detected results between the respective adjacent infrared sensors 33*a* to 33*f* is diagnosed to be normal or to be abnormal, for example, messages "between A-B: normal", "between B-C: abnormal", "between C-D: abnormal", "between D-E: normal", and "between E-F: normal". Here, the characters A to F correspond to the arrangement positions of the respective infrared sensors 33*a* to 33*f*. The messages of the detailed results can allow a user to immediately recognize that there is an abnormality in the infrared sensor 33*c* diagnosed to be abnormal with respect to the adjacent infrared sensors 33*b* and 33*d*.

Next, the processing performed when the air conditioner 1 according to the first embodiment diagnoses whether the operating state of the human detector 30 is normal or abnormal will be described. The user operates the buttons 47*a* to 47*d*, when trying to diagnose the operating state of the human detector 30. When detecting the operation of the user, the remote controller 40 displays a display screen 51 on the display 48*a*. The user presses the decision button 47*c* in a state in which the message of the "start" is selected. When the pressing of the decision button 47*c* is detected by the input section 47, the remote controller 40 outputs the input information indicating the transmission of the trigger signal to the indoor unit 10, to the remote controller control section 46. The remote controller control section 46 converts the obtained input information into the trigger signal in accordance with the acquisition of the input information, and transmits the trigger signal to the indoor unit 10 via the communication section 49.

FIG. 9 is a flowchart illustrating an example of processing of the diagnostic section 15 and the remote controller 40 in the air conditioner 1 according to the first embodiment. Further, in FIG. 9, the remote controller is abbreviated as a remote controller. The diagnostic section 15 checks whether the trigger signal is received from the remote controller 40 (step S11). When the trigger signal is not received from the remote controller 40 via the communication section 16 (No in step S11), the diagnostic section 15 returns to step S11. When a power supply voltage of the air conditioner 1 is turned on, the diagnostic section 15 repeats the step S11 until the trigger signal is received, and checks whether the trigger signal is received.

When receiving the trigger signal transmitted from the remote controller 40 via the communication section 16 (Yes in step S11), the diagnostic section 15 sets n=1 (step S12). Here, n is used to count the number of times when the diagnosis of a difference in the respective detected results is performed. Next, the diagnostic section 15 obtains the temperature information of the respective infrared sensors 33*a* to 33*f* from the indoor unit control section 14 (step S13). Specifically, the diagnostic section 15 outputs information indicating the reception of the trigger signal to the indoor unit control section 14. When the information indicating that the diagnostic section 15 receives the trigger signal is obtained from the diagnostic section 15, the indoor unit control section 14 obtains the infrared information of each of the infrared sensors 33*a* to 33*f* of the human detector 30 via the human detector control section 35. In the first embodiment, for example, the description will be given of a case where the indoor unit control section 14 converts the obtained infrared information into the temperature information. The indoor unit control section 14 outputs the temperature information of each of the infrared sensors 33*a* to 33*f* obtained by the conversion to the diagnostic section 15.

Next, the diagnostic section 15 compares the obtained temperature information of each of the infrared sensors 33*a* to 33*f*. In the first embodiment, the diagnostic section 15 calculates the difference (temperature difference) in the temperature information between the adjacent infrared sensors (step S14), and compares the difference in the temperature information obtained by the calculation with the first threshold value (step S15).

Next, the diagnostic section 15 compares the respective differences in the temperature information obtained by the calculation with the first threshold value in terms of magnitude (step S15). The diagnostic section 15 outputs the result of comparison in which a difference in temperature information between the infrared sensors 33*b* and 33*c*, and a difference in temperature information between the infrared sensors 33*c* and 33*d* are higher than the threshold value, and differences in temperature information between other adjacent infrared sensors are equal to or less than the threshold value.

When the difference in the temperature information between the adjacent infrared sensors is equal to or less than the first threshold value, the diagnostic section 15 determines the difference in the detected results to be normal, and when the difference in the temperature information is larger than the first threshold value, the diagnostic section 15 determines the difference in the detected results to be abnormal (step S15). When the difference in the temperature information is larger than the first threshold value (No in step S15), the diagnostic section 15 counts the difference in the temperature information (step S16). The process proceeds to step S17. Meanwhile, when the difference in the temperature information is equal to or less than the first threshold value (Yes in step S15), the diagnostic section 15 proceeds to step S17, without performing the step S16.

When n is less than N (No in step S17), the diagnostic section 15 adds 1 to the current n (Step S18), returns to step S13, and executes from step S13 to step S17. In this way, the diagnostic section 15 increases n one by one each time the diagnosis of the difference in the detected results is performed once. When n is N (Yes in step S17), the diagnostic section 15 proceeds to step S19.

By repeating from step S13 to step S17 N times, the diagnostic section 15 counts and integrates the difference in the temperature information when the difference in the detected results is diagnosed to be abnormal between the respective infrared sensors 33*a* to 33*f*. In the first embodiment, when there is an abnormality between the respective infrared sensors 33*a* to 33*f*, the sum of the counts of the difference in the temperature information exceeds a second threshold value, and the diagnostic section 15 diagnoses whether the difference in the detected results between the respective infrared sensors 33*a* to 33*f* is normal or abnormal (step S19).

When the sum of all counts between the respective infrared sensors 33*a* to 33*f* is equal to or less than the second threshold value (Yes in step S19), the diagnostic section 15 diagnoses the human detector 30 to be normal, and transmits the diagnostic result information indicating that the operating state of the human detector 30 is normal, to the remote controller 40 via the communication section 16 (step S20). The remote controller control section 46 receives the diagnostic result information indicating that the operating state of the human detector 30 is normal, from the indoor unit 10 via the communication section 49. When the remote controller control section 46 receives the diagnostic result information, the display section 48 switches the message of the display 48*a* to the display screen 52 (step S21) in accordance with the obtained diagnostic result information, and the flow of the diagnosis of the operating state of the human detector 30 is terminated. The display screen 52 causes a user to recognize that the operating state of the human detector 30 is diagnosed to be normal.

Meanwhile, when the sum of at least one count between the respective infrared sensors 33*a* to 33*f* is greater than the second threshold (No in step S19), the diagnostic section 15 diagnoses that the human detector 30 is abnormal, and transmits the diagnostic result information indicating that the operating state of the human detector 30 is abnormal, to the remote controller 40 via the communication section 16 (step S22). The remote controller control section 46 receives the diagnostic result information indicating that the operating state of the human detector 30 is abnormal, from the indoor unit 10 via the communication section 49. When the remote controller control section 46 obtains the diagnostic result information, the display section 48 switches the message of the display 48*a* to the display screen 53 in accordance with the obtained diagnostic result information (step S23), and the flow of the diagnosis of the operating state of the human detector 30 is terminated. The display screen 53 causes the user to recognize that the operating state of the human detector 30 is diagnosed to be abnormal.

The air conditioner 1 includes the human detector 30 having a plurality of the infrared sensors 33a to 33f, and diagnoses whether the operating state of the human detector 30 is normal or abnormal by comparing the detected results between the respective infrared sensors 33a to 33f. Therefore, according to the first embodiment, it is possible to perform the diagnosis of the operating state of the human detector 30, even when the operating state of the human detector 30 is not normal because at least one of the infrared sensors 33a to 33f is defective or degraded. By a simple operation from the remote controller 40, it is possible to simply perform the diagnosis of the operating state of the human detector 30.

Further, the air conditioner 1 specifies the infrared sensor that causes an abnormality of the operating state of the human detector 30, and can allow a user to recognize the specified infrared sensor by the display screen 54. Therefore, according to the first embodiment, it is possible to promote the user to replace only the infrared sensor that causes the abnormality, and it is possible to reduce the maintenance costs by improving the maintenance performance.

As described above, the diagnostic section 15 may determine whether the human detector 30 is abnormal, or may determine whether there is an abnormality between the infrared sensors of the human detector 30. For example, in the example of FIG. 8, the diagnostic section 15 compares the respective infrared sensors of the human detector 30, determines that the difference in the temperature information between the infrared sensors 33a and 33b is normal, determines that the difference in the temperature information between the infrared sensors 33b and 33c is abnormal, determines that the difference in the temperature information between the infrared sensors 33c and 33d is abnormal, determines that the difference in the temperature information between the infrared sensors 33d and 33e is normal, and determines that the difference in the temperature information between the infrared sensors 33e and 33f is normal. By displaying the display screen 54 illustrated in FIG. 8 on the display 48a on the basis of the obtained diagnostic result information, the display section 48 can allow the user to recognize that the operating state of the human detector 30 is diagnosed to be abnormal and can notify the user that the infrared sensor causing the abnormality is the infrared sensor 33c.

Further, in the first embodiment, the trigger signal is transmitted from the remote controller 40 to the indoor unit 10, but the invention is not limited thereto. For example, a configuration may be used in which the trigger signal is output from the indoor unit control section 14 to the diagnostic section 15 each time a predetermined period of time elapses to diagnose whether the operating state of the human detector 30 is normal or abnormal. Further, a configuration may be used in which the trigger signal is output from the indoor unit control section 14 to the diagnostic section 15 when the power supply voltage of the air conditioner 1 is turned on to diagnose whether the operating state of the human detector 30 is normal or abnormal.

Figure 10:
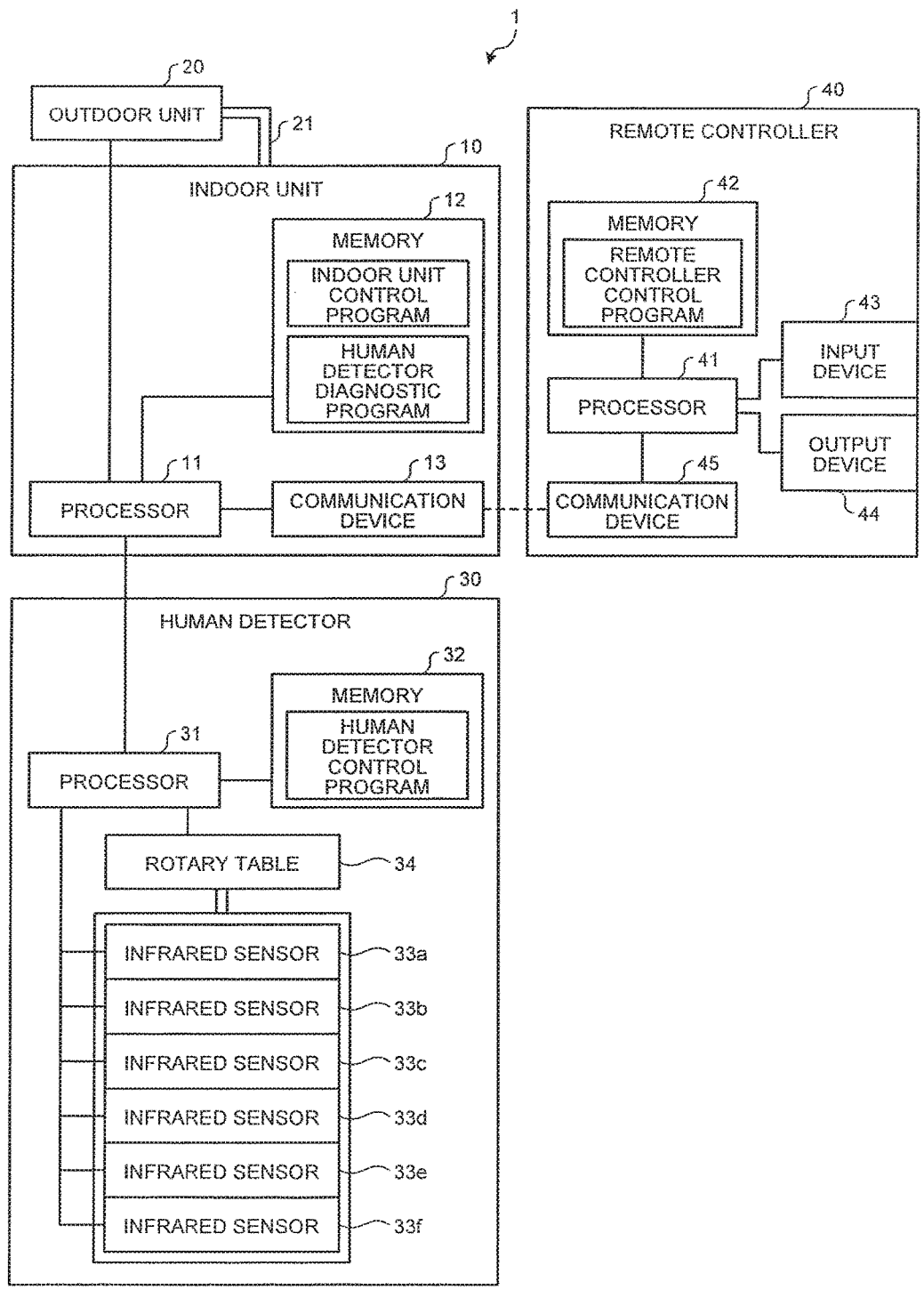
FIG. 10 is a diagram illustrating an outline of the air conditioner.

FIG. 10 is a diagram illustrating an outline of the air conditioner 1 according to the first embodiment. The indoor unit 10 includes a processor 11, a memory 12, and a communication device 13 that performs a radio communication. The indoor unit control program and the human detector diagnostic program are stored in the memory 12. In the first embodiment, as the communication device 13, a short-range radio communication device that performs the communication within a range from several centimeters to several meters is used. As such a device, devices using an infrared communication standard utilizing the infrared rays, a Wi-Fi (registered trademark) standard using the radio waves, and a Bluetooth (registered trademark) standard using the radio waves of 2.4 GHz are exemplified.

The human detector 30 includes a processor 31, a memory 32, infrared sensors 33a to 33f, and a rotary table 34. The human detector control program is stored in the memory 32. The remote controller (abbreviated as a remote controller in FIG. 10) 40 includes a processor 41, a memory 42, an input device 43 that accepts an input, an output device 44 that performs the output, and a communication device 45 that performs a radio communication. The remote controller control program is stored in the memory 42. A device similar to the communication device 13 is used as the communication device 45.

In the first embodiment, the indoor unit control section 14 and the diagnostic section 15 are achieved by executing each of the indoor unit control program and the human detector diagnostic program stored in the memory 12 through the processor 11, and the communication section 16 is achieved by the communication device 13. Further, a plurality of processors and a plurality of memories may perform the functions of the indoor unit control section 14 and the diagnostic section 15 in cooperation, and a system LSI (Large Scale Integration) or a plurality of processing circuits may perform the functions of the indoor unit control section 14 and the diagnostic section 15. Further, the functions of the indoor unit control section 14 and the diagnostic section 15 may be performed over a plurality of devices.

In the first embodiment, the human detector control section 35 is achieved by executing the human detector control program stored in the memory 32 through the processor 31. Further, a plurality of processors and a plurality of memories may perform the functions of the human detector control section 35 in cooperation, and a system LSI or a plurality of processing circuits may perform the functions of the human detector control section 35. Further, the functions of the human detector control section 35 may be performed over a plurality of devices.

Further, in the first embodiment, the remote controller control section 46 is achieved by executing the remote controller control program stored in the memory 42 through the processor 41. Further, a plurality of processors and a plurality of memories may perform the functions of the remote controller control section 46 in cooperation, and a system LSI or a plurality of processing circuits may perform the functions of the remote controller control section 46. Further, the functions of the remote controller control section 46 may be performed over a plurality of devices. The input section 47 is achieved by the input device 43, the display section 48 is achieved by the output device 44, and the communication section 49 is achieved by the communication device 45.

The configurations illustrated in the above embodiments are only an example of the contents of the present invention, the configurations may also be combined with other known techniques, and the configurations may also be partially omitted or modified within the scope that does not depart from the gist of the present invention.

The invention claimed is:

1. An air conditioner comprising:
an indoor unit;
an outdoor unit connected to the indoor unit;
a remote controller that communicates with the indoor unit and transmits a trigger signal to the indoor unit; and
a detector having a plurality of infrared sensors that detect infrared rays emitted from respective predetermined detection ranges of a room where the indoor unit is provided, wherein
the respective predetermined detection ranges are adjacently arranged, and
the indoor unit is configured to
operate the infrared sensors of the detector when a trigger signal is received,
obtain detected results of the infrared sensors, respectively,
in a first comparison, compare the detected results of a first pair of the infrared sensors,
if a difference between detected results of the first pair of the sensors is larger than a first threshold value, store the difference as a sum,
in a second comparison, compare the detected results of a second pair of the infrared sensors,
if a difference between the detected results of the second pair of the sensors is larger than the first threshold value, add the difference to the sum, and
if the sum is greater than a second threshold value, determine that the detector is abnormal.

2. The air conditioner according to claim 1, wherein
the indoor unit transmits a diagnostic result of the detector to the remote controller, and
the remote controller comprises a display section that displays the diagnostic result.

3. The air conditioner according to claim 1, wherein the detected results are temperature information measured by the infrared sensors.

4. The air conditioner according to claim 1, wherein the infrared sensors are arrayed in a row.

5. The air conditioner according to claim 1, wherein the infrared sensors are
(i) arranged linearly, or
(ii) arranged in a plurality of rows, or
(iii) arranged in a curved shape.

6. The air conditioner according to claim 1, wherein the infrared sensors are
(i) arranged in directions parallel to one another, or
(ii) arranged in directions different from one another.

7. The air conditioner according to claim 1, wherein the first pair of the sensors is a pair of adjacent sensors, and the second pair of sensors is a pair of adjacent sensors.

8. An air conditioner comprising:
an indoor unit;
an outdoor unit connected to the indoor unit;
a remote controller that communicates with the indoor unit and transmits a trigger signal to the indoor unit; and
a detector having a plurality of infrared sensors that detect infrared rays emitted from respective predetermined detection ranges of a room where the indoor unit is provided, wherein
the respective predetermined detection ranges are adjacently arranged, and
the indoor unit includes a diagnostic means that
operates the infrared sensors of the detector when a trigger signal is received,
obtains detected results of the infrared sensors, respectively,
in a first comparison, compares the detected results of a first pair of the infrared sensors,
if a difference between detected results of the first pair of the sensors is larger than a first threshold value, stores the difference as a sum,
in a second comparison, compares the detected results of a second pair of the infrared sensors,
if a difference between the detected result of the second pair of the sensors is larger than the first threshold value, adds the difference to the sum, and
if the sum is greater than a second threshold value, determines that the detector is abnormal.

9. The air conditioner according to claim 8, wherein
the indoor unit transmits a diagnostic result of the detector to the remote controller, and
the remote controller comprises a display section that displays the diagnostic result.

10. The air conditioner according to claim 8, wherein the detected results are temperature information measured by the infrared sensors.

11. The air conditioner according to claim 8, wherein the infrared sensors are arrayed in a row.

12. The air conditioner according to claim 8, wherein the infrared sensors are
(i) arranged linearly, or
(ii) arranged in a plurality of rows, or
(iii) arranged in a curved shape.

13. The air conditioner according to claim 8, wherein the infrared sensors are
(i) arranged in directions parallel to one another, or
(ii) arranged in directions different from one another.

14. The air conditioner according to claim 8, wherein the first pair of the sensors is a pair of adjacent sensors, and the second pair of sensors is a pair of adjacent sensors.

15. An air conditioner comprising:
an indoor unit;
an outdoor unit connected to the indoor unit;
a remote controller that communicates with the indoor unit and transmits a trigger signal to the indoor unit; and
a detector having a plurality of infrared sensors that detect infrared rays emitted from respective predetermined detection ranges of a room where the indoor unit is provided, wherein
the respective predetermined detection ranges are adjacently arranged,
the plurality of infrared sensors is rotationally driven about a rotation axis,
the infrared sensors are further arranged in a row that extends in the direction of the rotation axis, and
the indoor unit is configured to
operate the infrared sensors of the detector when a trigger signal is received,
obtain detected results of the infrared sensors, respectively,
in a first comparison, compare the detected results of a first pair of the infrared sensors,
if a difference between detected results of the first pair of the sensors is larger than a first threshold value, store the difference as a sum,
in a second comparison, compare the detected results of a second pair of the infrared sensors,
if a difference between the detected result of the second pair of the sensors is larger than the first threshold value, add the difference to the sum, and if the sum is greater than a second threshold value, determine that the detector is abnormal.

16. The air conditioner according to claim 15, wherein the indoor unit transmits a diagnostic result of the detector to the remote controller, and
the remote controller comprises a display section that displays the diagnostic result.

17. The air conditioner according to claim 15, wherein the detected result is temperature information measured by the infrared sensors.

18. The air conditioner according to claim 15, wherein the row is one of a plurality of rows of the infrared sensors.

19. The air conditioner according to claim 15, wherein the infrared sensors are
(i) arranged in directions parallel to one another, or
(ii) arranged in directions different from one another.

20. The air conditioner according to claim 15, wherein the first pair of the sensors is a pair of adjacent sensors, and the second pair of sensors is a pair of adjacent sensors.

* * * * *